United States Patent
Khanampornpan

(10) Patent No.: US 9,273,817 B2
(45) Date of Patent: Mar. 1, 2016

(54) STAND

(75) Inventor: Viroj Khanampornpan, Bangkok (TH)

(73) Assignee: Viroj Khanampornpan (TH)

( * ) Notice: Subject to any disclaimer, the term of this patent is extended or adjusted under 35 U.S.C. 154(b) by 95 days.

(21) Appl. No.: 13/979,398

(22) PCT Filed: Mar. 27, 2012

(86) PCT No.: PCT/TH2012/000013
§ 371 (c)(1),
(2), (4) Date: Jul. 12, 2013

(87) PCT Pub. No.: WO2012/134407
PCT Pub. Date: Oct. 4, 2012

(65) Prior Publication Data
US 2013/0299648 A1 Nov. 14, 2013

(30) Foreign Application Priority Data
Mar. 31, 2011 (TH) .................. 1101000474

(51) Int. Cl.
*A47B 3/00* (2006.01)
*F16M 11/00* (2006.01)
(Continued)

(52) U.S. Cl.
CPC .............. *F16M 11/00* (2013.01); *A47B 3/0815* (2013.01); *A47B 91/12* (2013.01); *B60B 33/06* (2013.01);
(Continued)

(58) Field of Classification Search
CPC ......... B60B 33/06; B60B 33/063; F16B 7/10; F16B 7/105; A47B 9/14; A47B 91/12; A47B 2025/006; B62B 5/0083
USPC ........ 248/188.5, 125.8, 125.7, 407, 418, 423, 248/425
See application file for complete search history.

(56) References Cited

U.S. PATENT DOCUMENTS 1,636,325 A * 7/1927 Roe .................................. 16/33
2,992,043 A * 7/1961 Nelson ..................... A47B 3/14
108/99

(Continued)

FOREIGN PATENT DOCUMENTS

FR 2720128 A1 11/1995
GB 2205351 A 12/1988
WO 9714332 A1 4/1997

OTHER PUBLICATIONS

Written Opinion and International Search Report of the International Searching Authority issued on Nov. 14, 2012 in International Application No. PCT/TH2012/000013.

*Primary Examiner* — Terrell McKinnon
*Assistant Examiner* — Eret McNichols
(74) *Attorney, Agent, or Firm* — Kim Winston LLP

(57) ABSTRACT

The present invention is directed to a stand 10 to be mounted to an article for example, the foldable-leg table. The stand 10 comprising a base portion 15, and a body portion 20 connected thereto, wherein the base portion 15 comprises a shaft having each end coaxially bent downward defining a leg 30, 30" forming a semi-rectangle like frame. The body portion 20 perpendicularly connected to the base portion 15 in an off-center manner toward one of the two legs of the base portion. The body portion 20 comprising an outer body 40 telescopically encasing an inner body 45. The inner body 45 being longer and smaller in diameter than the outer body 40 and includes two spaced-apart stopper holes, a first stopper hole 50 and a second stopper hole 55 along its length and having an end connected to the base portion 15. The inner body 45 is able to slide in and out along the length of the outer body 40. The outer body 40 comprising spaced-apart multiple pairs of brackets assembled thereto permitting mounting of the outer body 40 to the underside or backside of the article to be fitted with the stand 10. The stand is able to extend or retracted as needed.

17 Claims, 8 Drawing Sheets

(51) Int. Cl.

| | | |
|---|---|---|
| *B60B 33/06* | (2006.01) | |
| *F16B 7/10* | (2006.01) | |
| *A47B 91/12* | (2006.01) | |
| *B62B 5/00* | (2006.01) | |
| *A47B 3/08* | (2006.01) | |
| *A47B 25/00* | (2006.01) | |
| *A47B 9/14* | (2006.01) | |

(52) U.S. Cl.
CPC ............. *B60B 33/063* (2013.01); *B62B 5/0083* (2013.01); *F16B 7/10* (2013.01); *A47B 9/14* (2013.01); *A47B 2025/006* (2013.01); *F16B 7/105* (2013.01)

(56) References Cited

U.S. PATENT DOCUMENTS

| | | | | |
|---|---|---|---|---|
| 3,195,859 A * | 7/1965 | Jackson et al. | ................ | 254/2 R |
| 3,375,019 A * | 3/1968 | O'Day | ................ | B62B 5/0083 108/50.17 |
| 3,517,626 A * | 6/1970 | Gann et al. | ................ | 108/147.18 |
| 3,640,228 A * | 2/1972 | Busse | ................ | A47B 9/20 108/10 |
| 3,701,506 A * | 10/1972 | Favreau | ................ | 248/188.5 |
| 3,855,946 A * | 12/1974 | Bales | ................ | 108/147.21 |
| 4,040,658 A * | 8/1977 | Mayol | ................ | A47B 3/14 108/99 |
| 4,054,096 A * | 10/1977 | Wilson | ................ | E04H 3/28 108/169 |
| 4,133,271 A * | 1/1979 | Carlson | ................ | A47B 3/087 108/174 |
| 4,434,722 A * | 3/1984 | Solomon et al. | ................ | 108/8 |
| 4,819,569 A * | 4/1989 | Bastian | ................ | A47B 3/083 108/169 |
| 4,932,333 A * | 6/1990 | Jensen | ................ | A47B 3/14 108/175 |
| 5,613,450 A * | 3/1997 | Wagner et al. | ................ | 108/175 |
| 5,855,038 A * | 1/1999 | Dispense | ................ | A47B 37/04 16/34 |
| 5,931,488 A * | 8/1999 | Graziano | ................ | A47B 13/00 108/127 |
| 6,158,705 A * | 12/2000 | Cudmore et al. | ................ | 248/354.1 |
| 6,575,481 B1 * | 6/2003 | Davis | ................ | A47B 83/02 280/47.17 |
| 6,955,367 B1 * | 10/2005 | Simonsen | ................ | A47B 83/02 280/47.32 |
| 7,658,388 B1 * | 2/2010 | Rodriguez et al. | ................ | 280/30 |
| 7,806,381 B2 * | 10/2010 | Sisk Horne et al. | ................ | 248/354.5 |
| D674,627 S * | 1/2013 | Mecherle et al. | ................ | D6/708.16 |
| D675,042 S * | 1/2013 | Mecherle et al. | ................ | D6/691 |
| 8,807,494 B2 * | 8/2014 | Magnani et al. | ................ | 248/125.8 |
| 2001/0027736 A1 * | 10/2001 | Gosselin | ................ | 108/131 |
| 2002/0148394 A1 * | 10/2002 | Strong | ................ | 108/147.21 |
| 2004/0231917 A1 * | 11/2004 | Chick | ................ | 182/16 |
| 2009/0084923 A1 * | 4/2009 | Lin | ................ | 248/407 |
| 2010/0123055 A1 * | 5/2010 | Roddis | ................ | 248/125.8 |
| 2010/0140436 A1 | 6/2010 | Wu | | |
| 2015/0158408 A1 * | 6/2015 | Mason | ................ | B62B 5/0083 414/495 |

* cited by examiner

STAND

CROSS-REFERENCE TO RELATED APPLICATION

This application is a U.S. national phase application under 35 U.S.C. §371 of International Application No. PCT/TH2012/000013 filed on Mar. 27, 2012 which claims priority to Thailand application No. 1101000474 filed on Mar. 31, 2011, the entire disclosures of which are hereby incorporated by reference in their entirety.

BACKGROUND OF THE INVENTION

The present invention related to a stand, in particular a stand for use with a table with foldable legs.

In general, tables, especially the ones with foldable legs, for example, seminar tables or meeting tables or the like are demanded in a great number for each usage. This leads to the problem of storage. The legs of these tables are usually folded and lean against each other or stacked. As a result, problems including damages of the tabletop surface such as scratch marks from the table legs while being stacked are common. Further, collapsing or slippage of the stacked table or while leaning against each other are also common. This may cause injury to the operators.

SUMMARY OF THE INVENTION

The objective of the present invention is to provide a stand for use in the storage of the foldable-leg tables to facilitate the storage when not in use. This will save the storage space, reduce damages resulting from the abrasion causes by stacking of tables 1, and reduce risks of danger due to the improper storage that will otherwise cause the slippage of the table to bump against or fall over the operator. It further facilitates moving of these tables with less effort and ease. The stands in accordance with the present invention include at least one pair of stands mounted to the back surface of a table. The stand is extendable during usage and retractable to the back or underside of the table body when the table is in used. The stand may have a wheel mounted thereto for the convenient moving or relocating.

DETAILED DESCRIPTION OF THE INVENTION

Figure 1:
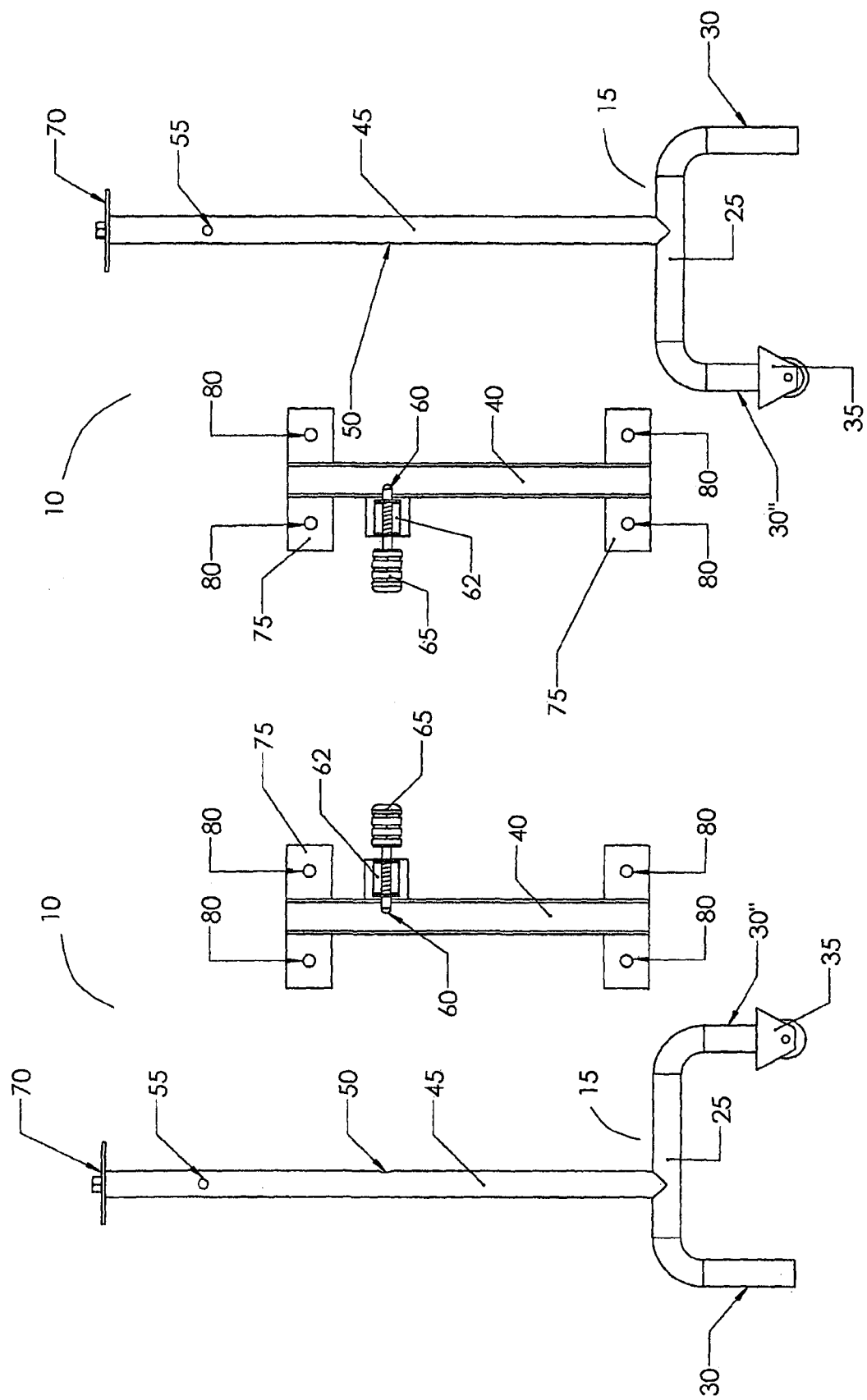
FIG. 1 shows exploded view of an embodiment of a stand in accordance with the present invention with an illustrating the sectional view of the outer body.
Figure 2:
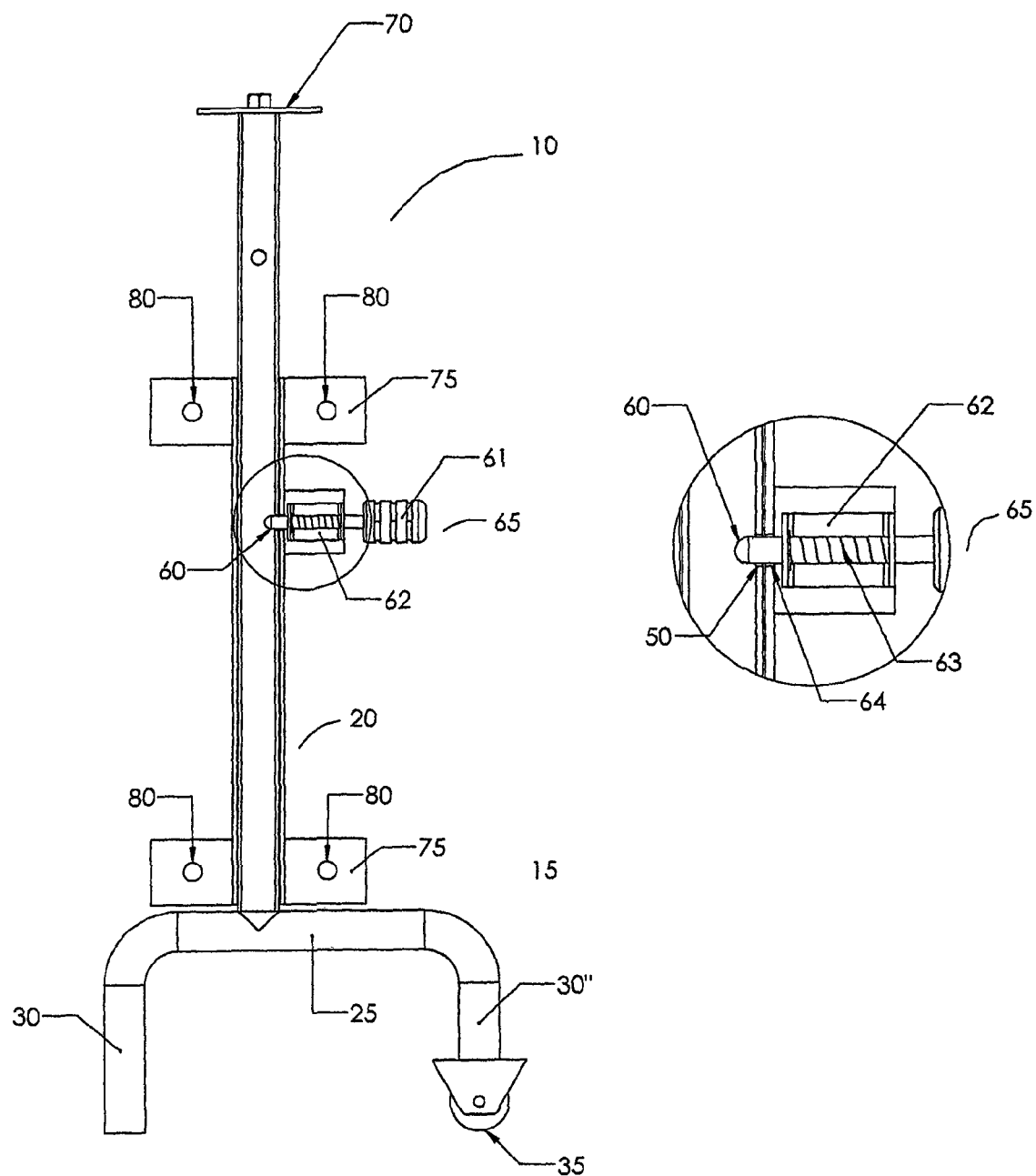
FIG. 2 shows an embodiment of a stand in accordance with the present invention illustrating the sectional view of the out body and inner body.

As shown in FIG. 1, a pair of a stand 10 in accordance with the present invention is mounted to the back of the foldable-leg table. Each of the stand 10 is spaced-apart for an optimum distribution of load of the table to ensure balance of the placement. Each stand 10 comprises a base portion 15 and a body portion 20 connected thereto.

A base portion 15 is a downwardly facing semi-rectangle-like frame. That is, it is formed of a longitudinal shaft 20 whereby each end of the shaft 20 is coaxially bent downward defining leg portions 30, 30" integrally formed at each end of the shaft 20 deriving the semi-rectangle-like frame. The bent corner of the leg portions 30, 30" are preferably round to minimize or mitigate the injury in case of the accidental collision or impact with the leg portion 30, 30" as shown in FIG. 1 and other Figures. One end of the leg portion 30" may further comprise a wheel 35 to increase the convenience in moving or relocating the table. For the sake of the material saving and the manufacturing cost saving, the base portion 15 should be made of hollow durable material but have proper thickness to ensure strength and ability to withstand the load or the table weight.

A body portion 20 is formed, preferably of the same material as with the base portion 15 and is fitted perpendicularly to the base portion 15 It is mounted toward one of the legs 30, 30", i.e., away from the center [off-center], of the spaced-apart legs 30, 30". As shown in FIG. 1, in the embodiment where the end of the leg 30" includes a wheel 35, the body portion 20 is off-center mounted toward the leg 30 with no wheels 35 installed thereto. This is so arranged to prepare a space at the shaft 25, between the body 20 and the leg 30" of which installed with the wheel 35 to accommodate the table edge allowing the load to be directed to the center of the base 15 creating a balance of weight avoiding excessive load exerted on either front or back side that may cause the table to stumble or fall over to either sides.

The body portion 20 is a hollow cylinder comprising the outer body 40 and the inner body 45 nested together. The inner body 45 is longer than the outer body 40 and is smaller in diameter than the outer body 40 allowing the inner body to be slidable inside the outer body. The body portion 20 is hence, able to telescope longitudinally. One end of the inner body 45 is permanently connected to the base portion 15.

The inner body 45 is provided with two spaced-apart stopper holes, which are the first stopper hole 50 and the second stopper hole 55 prepared along the length of the inner body 45. The distance between the spaced-apart stopper holes determines how much the stand 10 is able to extend from the table edge or retract to the inner portion of the lower part of the table 100 in such a manner that when it is extended, the table edge will coincide with the shaft 25 of the base portion 15 to allow the shaft 25 of the base portion 15 to bear the weight of the table body. Further, when the stand is not in use, that is, when the table is taken out for use, the stand 10 is retracted to the inner part of the table 100 leaving no portions of the stand 10 protruding out of the table edge.

Size of the first and second stopper hole 50, 55 stopper corresponds to the size of a spindle 60 of a stopper 65 arranged at the outer body 40 to accommodate the spindle 60 of the stopper 65 fitted to the outer body 40 as will be later described.

As mentioned above, other than being provided with a certain distance along the length of the inner body 45, the first stopper hole 50 and the second stopper hole 55 are also provided at different positions on the circumference of the inner body 45. That is to say, the first stopper hole 50 and the second stopper hole 55 are approximately 90 degrees apart on the circumference of the inner body 45 permitting turning and securing [locking] the stand 10 at the required positions or postures, i.e. when not in used as shown in FIG. 3 or when in used as shown in FIG. 4.

Further, at the tip of the inner body 45, opposite to the shaft 25 includes a guide cap 70 serving to cover the inner body 45 which is a hollow tube as well as prevents the inner body 45 from unintentionally sliding out of the outer body 40. The guide cap 70 also serves to determine the position that the user turns the inner body 45. By turning the base portion 15 connected to the inner body 45, the turning will bring the first stopper hole 50 or the second stopper hole 55 of which their respective positions are out of view [conceal the outer body 40] into the position where the spindle 60 of the stopper 65 of the outer body 40 engaged thereto when the position of the stand 10 is required to be locked for the retraction during storage or unlocked so as to allow extension of the stand 10, the detail operation of which will be further discussed below The outer body 40 is a hollow cylindrical tube sheathing the inner body 45 with the length that is shorter than that of the inner body 45 and mounted with the brackets 75. Shown in FIGS. 1-7 is the embodiment including one pair of the brackets 75 at each end of the outer body 40. Each pair of brackets 75 is connected at the left and right of the outer body 40 and each side of which is provided with a hole 80 to receive a fastening member, for example, a threaded screw for securing the stand 10 to the lower portion of the table 100 once the stand 10 is mounted to the table body.

At the outer body 40, there is provided a stopper 65 with a spring-type spindle 60 mounted thereto. The stopper includes the spring-type pin comprising a head 61 for gripping and a rod-like spindle 60 kept in a box-shape spindle chamber 62. The size of the spindle 60 corresponds to that of the size of the stopper holes 50, 55 provided at the inner body 45 and the length correspond to the distance from the head 61 across the spindle chamber 62 and through the through hole 64 of the outer body 40 and the inner body 45 to the hollow inner portion of the inner body 45. A coil spring 63 is mounted to the spindle 60 providing a spring-action permitting the spindle 60 to be pulled out of or pushed back into the stopper holes 50, 55. This will allow the locking and the unlocking between the outer body 40 and the inner body 45. For the stand 10 to extend and retract and for the ease of the retraction and the extension of the stand 10, the spindle chamber 62 includes two retention walls and are provided with sufficient space to retain the spindle 60 of the stopper 65. That is, when the stand 10 is required to be retracted or extended, the spindle 60 of the stopper 65 which is of the spring type will be pulled out from the stopper hole 50, 55 to unlock the outer body 40 and the inner body 45 from each other and is manipulated to bias and abut either corner of the spindle chamber 62 and the spindle 60 allowing the inner body 45 to slide in and out in order to facilitate the retraction and the extension. When locking is required, the spindle is pulled back and is manipulated to be inserted into the stopper hole 50, 55 again.

Figure 3:
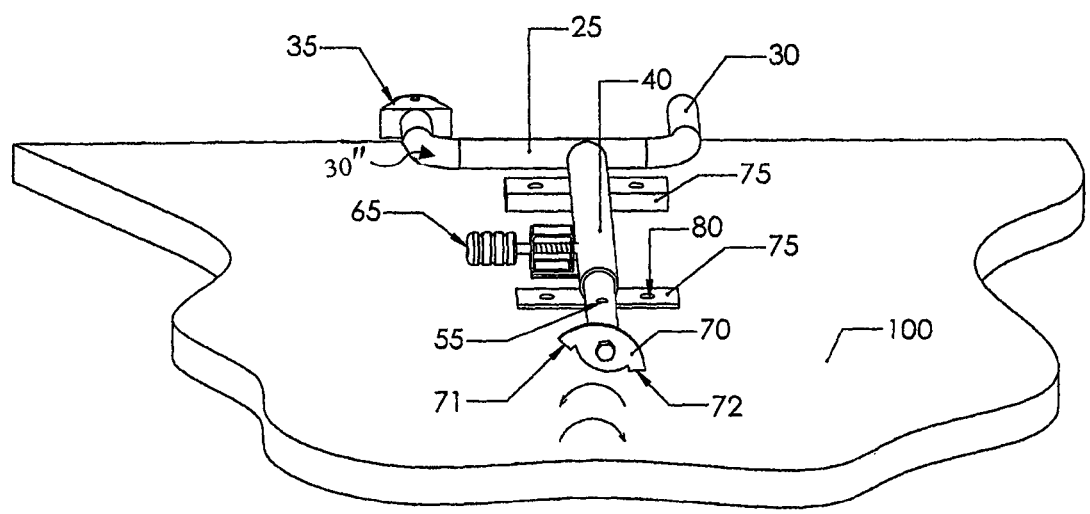
FIG. 3 shows top elevated view of an embodiment of the stand in accordance with the present invention when the stand is stored.
Figure 4:
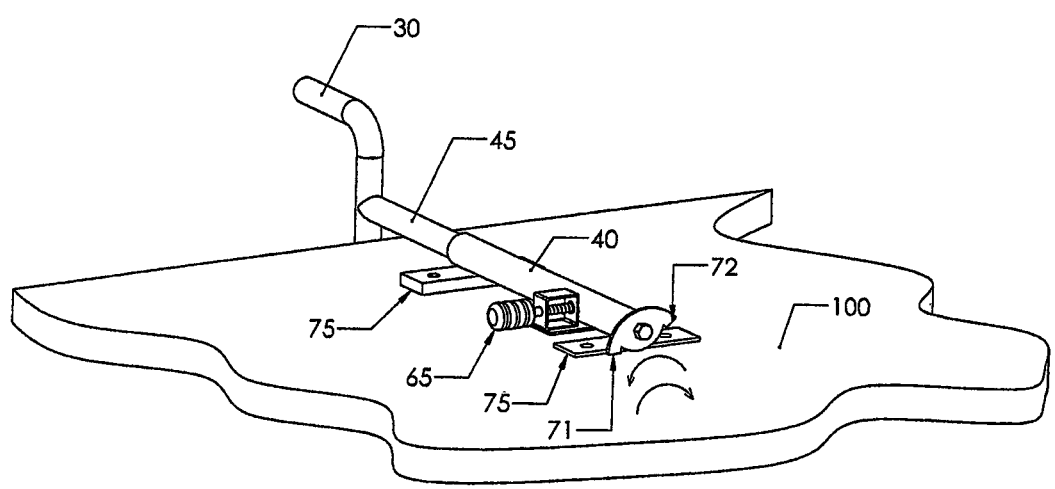
FIG. 4 shows perspective view of the embodiment of the stand of FIG. 3 with the extended leg.
Figure 5:
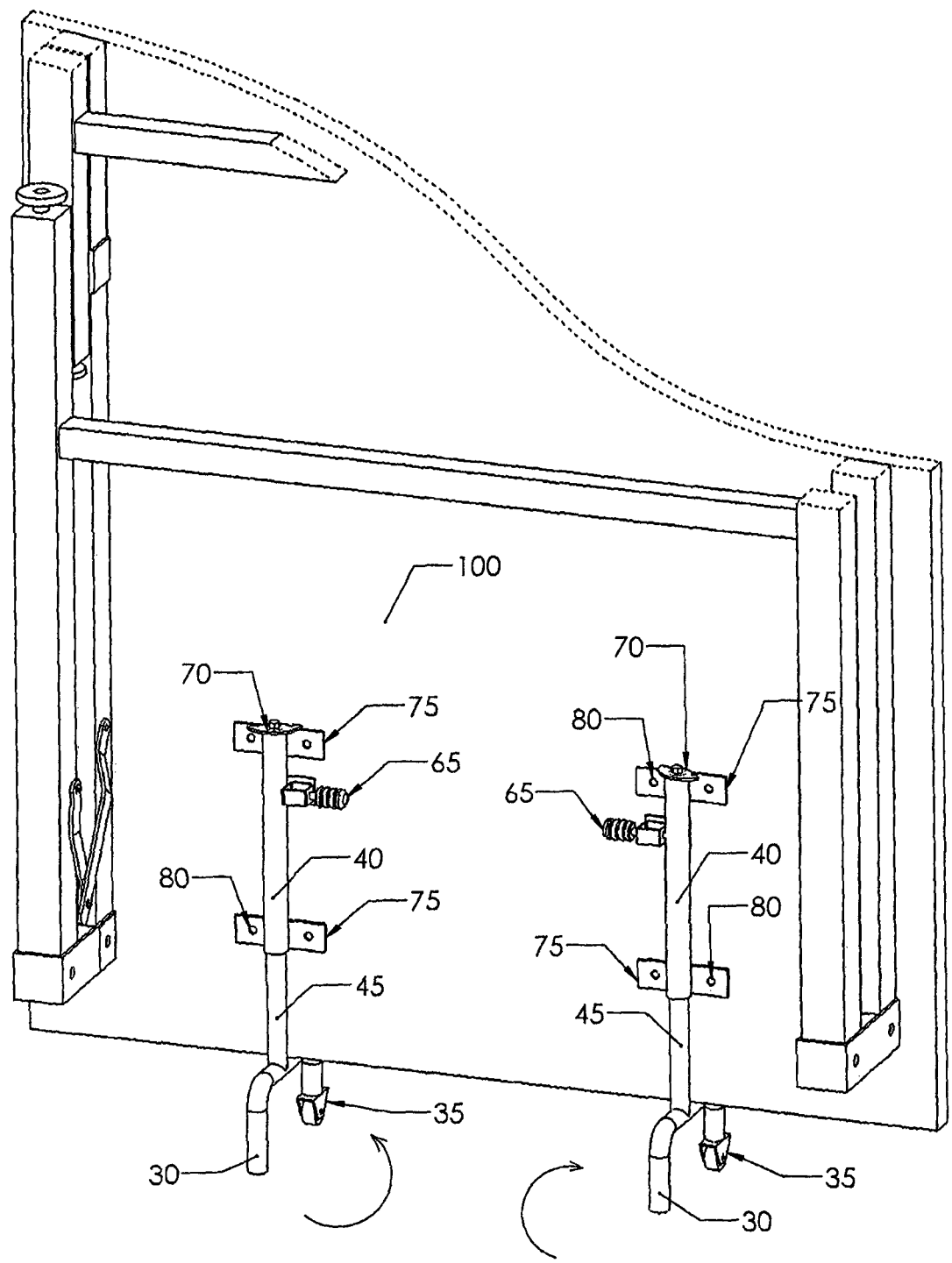
FIG. 5 shows rear view of use of an embodiment of the stand in accordance with the present invention.

As shown in FIG. 3, in use, stand 10 is mounted to the lower portion of the table 100 by fasteners such as a screw, a bolt or the like to secure the stand 10 to the lower part of the table 100 through the hole 80 provided at the bracket 75. When not in use, the stand 10 is stored away by locking the inner body 45 of the stand 10 to the outer body 40 through the first stopper hole 50 of the inner body 45. The leg portions 30, 30" of the base portion 15 retracted inward away from the edge of the table 100 to prevent the part of the stand 10 or its respective parts from extending beyond the table edge when the table 10 is in used. It can be seen from FIG. 3 that the inner body 45 can be rotated inside the outer body 40 for the distance of 180 degrees. Alignment of the first stopper hole 50 or the second stopper hole 55 with the position of the spindle 60 of the stopper 65 to lock the inner body 45 and the outer body 40 together can sometimes become difficult as the first stopper hole 50 or the second stopper hole 55 is hidden inside the outer body 40. The inner body 45 thus includes the guide cap 70 to align the first stopper hole 50 or the second stopper hole 55 with the position of the spindle 60 of the stopper 65 as mentioned above that the first stopper hole 50 or the second stopper hole 55 is 90 degree apart on the circumference of the inner body. The guide cap 70 includes the first brace 71 and the second brace 72, restricting the inner bodies 45 to be turned at no more than 90 degrees. That is, when not in use, the stand 10 is retracted in the storage position by locking the inner body 45 of the stand 10 to the inner body 45 through the first stopper hole 50 and in this position the second brace 72 is perpendicular to the underside surface of the table 100. In FIG. 4, when the stand 10 is pulled out to be used, the inner body 45 is extended in a sliding manner and turned for 90 degrees to turn the second stopper hole 55 to the position of the spindle 60 of the stopper 65. In such a manner, the guide cap 70 will be slid to abut the upper end of the outer body 40 while the first brace 71 is turned to the exact perpendicular position with the underside surface of the table 100. This thus locks the inner body 45 and the outer body 40 together. The base portion 15 will then abut the table edge while the leg portions 30" of the shaft 25 with the wheel 35 attached thereto, or in the embodiment without the wheel 35, the leg 30 at farther side of the body portion 20, will be turned 90 degrees and thus makes the leg portions 30" with the wheel 35 or the leg 30 on the farther side of the body portion 20 extends beyond the front (upper surface) side of the table. Therefore, all of the table weight is exerted on the shaft 25 of the base portion 15 immediately adjacent to the table edge when the stand 10 is placed vertically as shown in FIG. 5.

Figure 6:
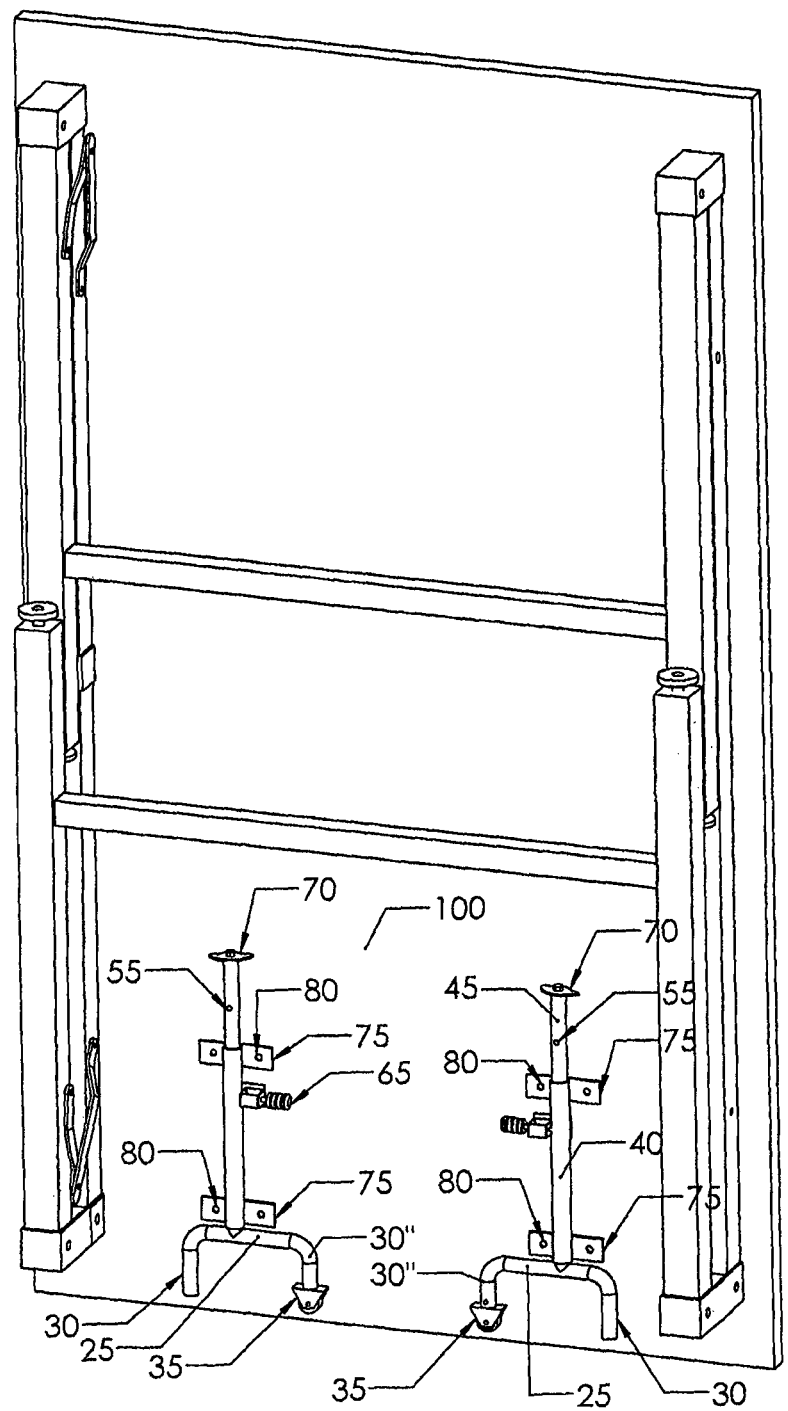
FIG. 6 shows rear view of use an embodiment of the stand in accordance with the present invention when the stand is not in use.
Figure 7:
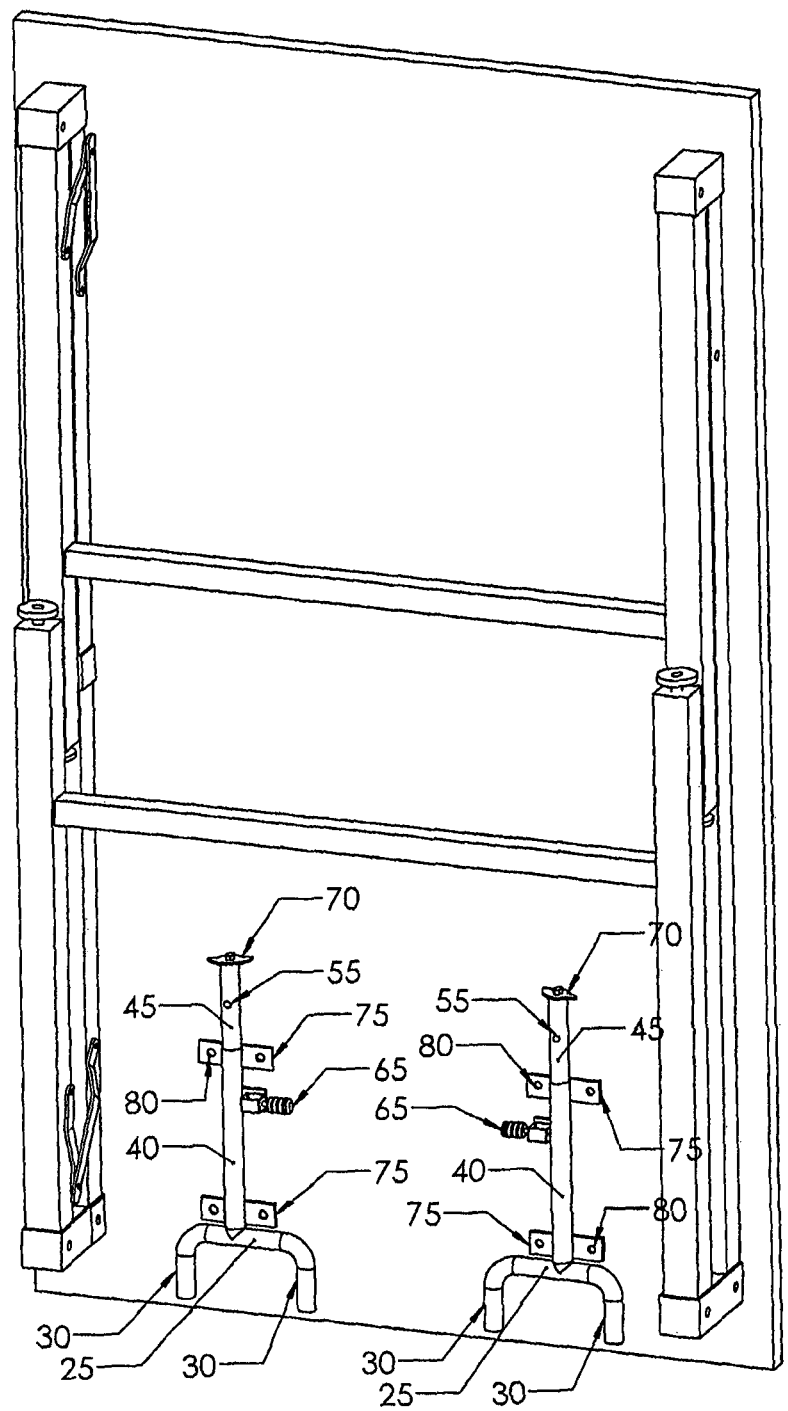
FIG. 7 shows rear view of use of another embodiment of the stand in accordance with the present invention when the stand is not in use.
Figure 8:
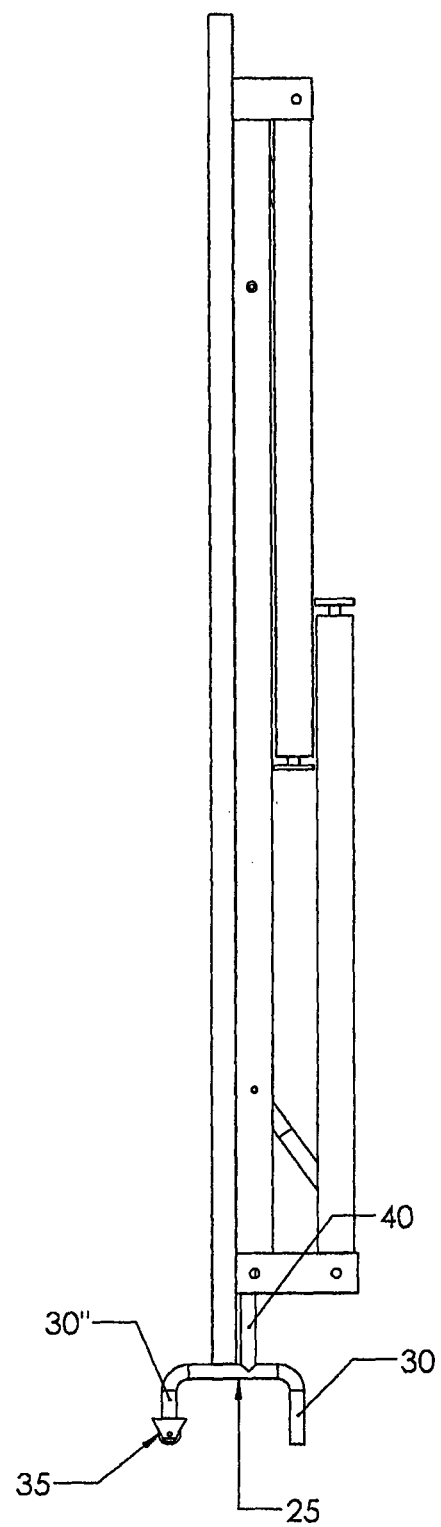
FIG. 8 shows side view of an embodiment of the usage of the stand in accordance with the present invention.

FIG. 6 and FIG. 7 show mounting of the stand 10 to the underside of the table 100, especially, the side without an obstruction of table's foldable legs mounted thereto. FIG. 6 shows an embodiment of the leg portions 30" with the wheel 35 while FIG. 7 shows the embodiment without the wheel 35. The embodiment with the wheel 35 is more preferable since it will mitigate the load allowing moving of the table with ease. As shown in FIG. 8, during the use, the table edge will precisely abut the shaft 25 of the base portion 15. If the table needs to be moved, the mover simply tilts the table until the side with no wheel 35 is lifted off the floor and pushed forward to the desired position. This will increase ease and reduces required man power of lifting equipment for the moving.

As shown in the exemplary embodiments, the stand 10 in accordance with the present invention is suitable for the mounting with the non-decorative side edge, that is, the plain-edge table. This is due to the fact that the side edge of the table will obstruct the in-out sliding for the retraction or the extension of the stand. However, if it is used with the table with edges, the bracket 75 of the stand 10 may be modified to lift the body portion 20 of the stand 10 to the extent higher than the width or the height of the decorative edge. This will allow the inner body 45 to be slid in and out along the length of the outer body 40 to retract and extend the stand 10.

According to the above details, it can be seen that the stand facilitates the storage of the foldable-leg tables when not in use. It helps to save storage space, reduce damages from the abrasion of the table legs [as the table may be stand upright without the need of stacking], and reduce risks of danger due to the improper storage that will otherwise cause the slippage of the table to bump against or fall over the operator. It further eases the moving of these tables with less effort, manpower of lifting equipments and hence, meets the objective of the present invention.

Although the detailed disclosure of the present invention is the exemplification of the implementation of the stand in accordance with the present invention with other articles including a board, a panel, a partition, and the like.

I claim:

1. A stand (10) coupled to an article, the stand comprising a base portion (15), and a body portion (20) connected thereto, wherein
the base portion (15) comprises a shaft having each end coaxially bent downward defining a leg (30, 30") forming a semi-rectangle like frame; the body portion (20) perpendicularly connected to the base portion (15) in an off-center manner toward one of the two legs of the base portion (15), wherein
the body portion (20) is a hollow cylinder comprising an outer body (40) telescopically encasing an inner body (45), the inner body (45) being longer and smaller in diameter than the outer body (40) and includes two spaced-apart stopper holes, a first stopper hole (50) and a second stopper hole (55) along its length, and having an end connected to the base portion (15); characterized in that:
the spaced-apart first stopper hole (50) and the second stopper hole (55) are arranged at a distance and said distance determines the extent of retraction and extension capability of the stand (10), the first stopper hole (50) and the second stopper hole (55) provided on the circumference of the inner body (45) are 90 degrees apart;
the inner body (45) is slidable in and out along the length of the outer body (40); and
the outer body (40) comprising a longitudinal axis and spaced-apart multiple pairs of brackets (75) assembled thereto; wherein the outer body (40) is mounted to an underside or backside of the article with its longitudinal axis substantially parallel to the underside or backside of the article, and the outer body (40) includes a stopper with a spring-type spindle (60) movable in and out of a chamber (62) by the spring force, the spindle (60) being able to be inserted through the first stopper hole (50) or the second stopper hole (55) provided at the inner body (45) and a through hole (64) provided at the outer body (40) in the same position as that of the spindle (60) enabling locking of the outer body (40) and the inner body (45) together.

2. The stand (10) according to claim 1, wherein the inner body (45) further comprising a guide cap (70) mounted at the tip of the inner body (45) opposite the base portion (15), the guide cap (70) comprising a first brace and a second brace (71, 72) for abutting the article thereby restricting rotation of the inner body to align the first stopper hole (50) or the second stopper hole (55) with the spindle (60) when locking of the outer body (40) and the inner body (45) is required.

3. The stand (10) according to claim 2, whereby when the outer body (40) and the inner body (45) are locked together at the first stopper hole (50), the second brace (72) is perpendicular to the underside or backside of the article coupled with the stand (10) mounted therewith; and whereby when the outer body (40) and the inner body (45) are locked together at the second stopper hole (55), the first brace (71) is perpendicular to the underside or backside of the article.

4. The stand (10) according to claim 3, wherein the stopper comprising a head (65) and the spindle (60) connected to the head (65), the spindle (60) having a coil spring (63) mounted therewith, the spindle (60) being kept inside the spindle chamber (62), the spindle (60) having an entire length extending from the head (65) through to the spindle chamber (62) through the outer body (40) via the through hole (64) and through the inner body (45) via the first stopper hole (50) or the second stopper hole (55) reaching the hollow inner portion of the inner body (45) and being retractable from and extendable to the first stopper hole (50) or the second stopper hole (55) as well as the through hole (64) of outer body (40); the spindle chambers (62) includes two side walls creating a space for a retention of the tip of the spindle (60) allowing unlocking of the outer body (40) and the inner body (40) when the spindle (40) is manipulated to abut the chamber's wall.

5. The stand (10) according to claim 4, wherein the leg (30") situated at the farther position from the body portion (20) further comprising a wheel (35) mounted to the end of the said leg (30").

6. The stand (10) according to claim 3, wherein the leg (30") situated at the farther position from the body portion (20) further comprising a wheel (35) mounted to the end of the said leg (30").

7. The stand (10) according to claim 3, for use with a foldable-leg table, a board, a panel or a partition.

8. The stand (10) according to claim 2, wherein the stopper comprising a head (65) and the spindle (60) connected to the head (65), the spindle (60) having a coil spring (63) mounted therewith, the spindle (60) being kept inside the spindle chamber (62), the spindle (60) having an entire length extending from the head (65) through to the spindle chamber (62) through the outer body (40) via the through hole (64) and through the inner body (45) via the first stopper hole (50) or the second stopper hole (55) reaching the hollow inner portion of the inner body (45) and being retractable from and extendable to the first stopper hole (50) or the second stopper hole (55) as well as the through hole (64) of outer body (40); the spindle chambers (62) includes two side walls creating a space for a retention of the tip of the spindle (60) allowing unlocking of the outer body (40) and the inner body (40) when the spindle (40) is manipulated to abut the chamber's wall.

9. The stand (10) according to claim 8, wherein the leg (30") situated at the farther position from the body portion (20) further comprising a wheel (35) mounted to the end of the said leg (30").

10. The stand (10) according to claim 2, wherein the leg (30") situated at the farther position from the body portion (20) further comprising a wheel (35) mounted to the end of the said leg (30").

11. The stand (10) according to claim 2, for use with a foldable-leg table, a board, a panel or a partition.

12. The stand (10) according to claim 1, wherein the stopper comprising a head (65) and the spindle (60) connected to the head (65), the spindle (60) having a coil spring (63) mounted therewith, the spindle (60) being kept inside the spindle chamber (62), the spindle (60) having an entire length extending from the head (65) through to the spindle chamber (62) through the outer body (40) via the through hole (64) and through the inner body (45) via the first stopper hole (50) or the second stopper hole (55) reaching the hollow inner portion of the inner body (45) and being retractable from and extendable to the first stopper hole (50) or the second stopper hole (55) as well as the through hole (64) of outer body (40); the spindle chambers (62) includes two side walls creating a space for a retention of the tip of the spindle (60) allowing unlocking of the outer body (40) and the inner body (40) when the spindle (40) is manipulated to abut the chamber's wall.

13. The stand (10) according to claim 12, wherein the leg (30") situated at the farther position from the body portion (20) further comprising a wheel (35) mounted to the end of the said leg (30").

14. The stand (10) according to claim 12, for use with a foldable-leg table, a board, a panel or a partition.

15. The stand (10) according to claim 1, wherein the leg (30") situated at the farther position from the body portion (20) further comprising a wheel (35) mounted to the end of the said leg (30").

16. The stand (10) according to claim 15, for use with a foldable-leg table, a board, a panel or a partition.

17. The stand (10) according to claim 1, for use with a foldable-leg table, a board, a panel or a partition.

\* \* \* \* \*